April 4, 1961    F. B. WHISLER    2,978,001
MEAT CUTTING BAND SAW WITH BLADE CLEANER
Filed Aug. 29, 1958

FORREST B. WHISLER
INVENTOR.

BY *Lyon & Lyon*
ATTORNEYS

United States Patent Office 2,978,001
Patented Apr. 4, 1961

2,978,001

MEAT CUTTING BAND SAW WITH BLADE CLEANER

Forrest B. Whisler, Box 175, Coachella, Calif.

Filed Aug. 29, 1958, Ser. No. 758,055

1 Claim. (Cl. 143—158)

This invention relates to meat cutting apparatus and is particularly directed to improvements in band saws for cutting meat and bone.

Chops and steaks and other cuts of meat are often individually wrapped in transparent packages and marketed in serve-yourself type retail stores. Packaged meat cuts of this type as well as those displayed without individual wrapping are made as attractive as possible to preserve eye appeal and enhance saleability. It is often required that each individual piece of meat be wiped off by hand to remove bone-dust which accumulates on the meat as a result of the use of conventional meat cutting band saws. Although the cost of this hand labor operation is relatively high the hand wiping operation has been necessary to preserve the attractive appearance of the meat cuts.

It is the principal object of this invention to provide a means for eliminating the necessity of hand wiping individual cuts of meat to remove bone-dust. Another object is to provide an improved form of band saw blade for cutting meat and bone which operates to collect the bone-dust as it is being formed and to provide novel means for removing the bone-dust from the blade. Other and more detailed objects and advantages will appear hereinafter.

Figure 1:
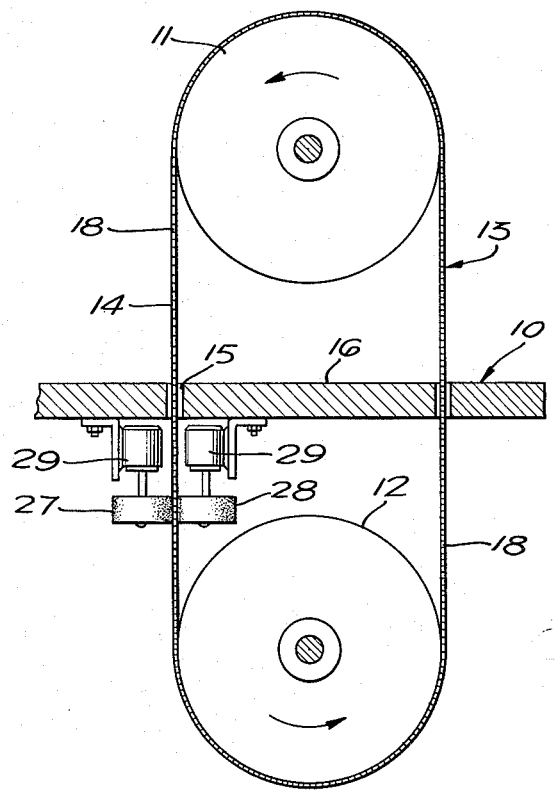
Figure 1 is a side elevation in diagrammatic form showing a meat cutting band saw device embodying my invention.
Figure 2:
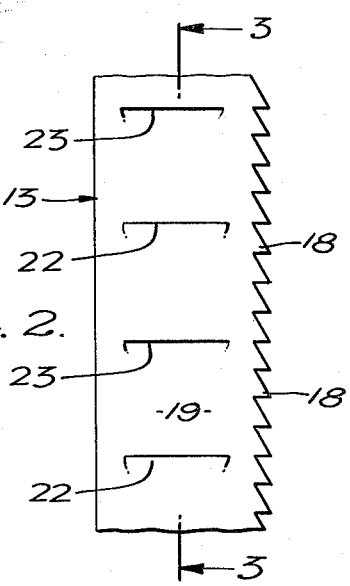
Figure 2 is a side elevation on an enlarged scale showing details of the band saw blade.

Referring to the drawings, a frame generally designated 10 supports a pair of vertically spaced pulley wheels 11 and 12. An endless band saw blade 13 is trained over the pulley wheels 11 and 12, and the downward moving flight thereof 14 passes through a clearance aperture 15 provided in the stationary platform 16. This platform 16 is supported on the frame 10 in a position between the pulley wheels 11 and 12. Conventional means (not shown) are provided for driving one of the pulley wheels.

Figure 3:
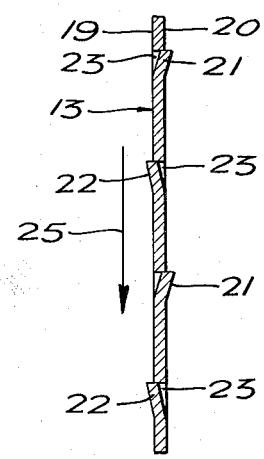
Figure 3 is a sectional elevation taken substantially on the lines 3—3 as shown in Figure 2.

The band saw blade 13 has a series of teeth 18 formed along one edge thereof and has parallel side faces 19 and 20 interrupted at longitudinally spaced locations by laterally directed projections or ridges 21 and 22. These ridges 21 and 22 project alternately from opposite faces of the blade 13; the ridges 21 project from the face 19 and the ridges 22 project from the face 20. A pocket 23 is formed adjacent each of the projecting ridges. I have found that good results are achieved if the ridges project laterally for approximately one-half the thickness of the blade 13. When the downward-moving flight 14 of the endless band saw blade 13 passes through meat and bone supported on the platform 16, the saw teeth 18 produce bone-dust as the blade progresses through the bony part of the meat. This dust is collected in the pocket 23 and on the projecting surfaces of the ridges 22 as the blade travels in the direction of the arrow 25 as shown in Figure 3.

Means are provided for removing the bone-dust from the blade 13 after the blade has travelled through the aperture 15 and prior to its initial contact with the lower pulley wheel 12. As shown in the drawings this means includes a pair of power driven rotary brushes 27 and 28 adapted to contact the side faces 19 and 20 of the blade 13 respectively. The brushes 27 and 28 are individually driven from electric motors 29 and they are adjustably mounted on the frame 10 in a manner so that they may be canted or tilted as desired. The brushes 27 and 28 serve to remove the bone-dust from the projections and pockets on the side faces of the band saw blade 13, and the bone-dust as thus removed may be allowed to collect in a sediment chamber or disposed of in any suitable manner. Since the dust does not remain on the blade 13 it is not carried around the pulleys 11 and 12. The coating of bone-dust on the individual cuts of meat is substantially eliminated.

Having fully described my invention it is to be understood that I do not wish to be limited to the details herein set forth, but my application is of the full scope of the appended claim.

I claim:

In a band saw device for cutting meat and bone, the combination of: a frame, vertically spaced upper and lower pulley wheels on the frame, an endless band saw blade trained over the pulley wheels, a platform on the frame positioned between the pulley wheels and adjacent the downward-moving flight of the band saw blade, one edge of the band saw blade having teeth thereon, the side faces of the band saw blade having longitudinally spaced ridge elements extending substantially at right angles to the direction of movement of the blade, each of said ridge elements terminating short of the side edges of the blade, and being adapted to collect bone-dust produced by the saw teeth, and a pair of power driven rotary brushes positioned on the frame below said platform, each of said brushes contacting one side of said blade, the parts of each rotary brush contacting the side faces of the blade moving substantially parallel to said ridges.

References Cited in the file of this patent

UNITED STATES PATENTS

| 234,062 | Proctor | Nov. 2, 1880 |
| 877,799 | Rider | Jan. 28, 1908 |
| 940,518 | Dunn et al. | Nov. 16, 1909 |
| 1,438,540 | McKenna | Dec. 12, 1922 |
| 1,566,880 | Kelley | Dec. 22, 1925 |
| 1,676,071 | Bolinder | July 3, 1928 |
| 2,113,931 | Biro | Apr. 12, 1938 |
| 2,152,183 | Fetterolf | Mar. 28, 1939 |

FOREIGN PATENTS

| 931,067 | Germany | Aug. 1, 1955 |